United States Patent [19]

Goldfarb et al.

[11] 4,198,068
[45] Apr. 15, 1980

[54] MOVABLE AMUSEMENT TOY

[75] Inventors: Adolph E. Goldfarb, 4614 Monarca Dr., Tarzana, Calif. 91356; Delmar K. Everitt, Woodland Hills, Calif.

[73] Assignee: Adolph E. Goldfarb, Northridge, Calif.

[21] Appl. No.: 876,629

[22] Filed: Feb. 10, 1978

[51] Int. Cl.² ............................................ A63G 19/00
[52] U.S. Cl. ..................................... 280/1.1 R; 46/204
[58] Field of Search ................... 280/1.11 R, 1.11 A, 280/1.12, 1.13, 1.21, 1.22, 1.1 R, 1.1 A, 282, 289 R; 46/204, 205, 175 R, 43; 35/13

[56] References Cited

U.S. PATENT DOCUMENTS

| 2,578,579 | 12/1951 | Mysels | 46/204 |
|---|---|---|---|
| 2,937,475 | 5/1960 | Crawford | 46/205 |
| 3,804,427 | 4/1974 | Lohr et al. | 280/1.11 R |
| 3,939,605 | 2/1976 | Allen | 46/204 |

*Primary Examiner*—John A. Pekar
*Attorney, Agent, or Firm*—Robert M. Ashen; Robert J. Schaap

[57] ABSTRACT

A movable amusement toy in the form of a vehicle adapted for pulling, and which is also provided with a seat for a user to push the vehicle with his legs while sitting on the same. The vehicle could also be adapted for pedalling action. A "popper" or ejecting mechanism provides an action or ejecting or "popping" balls or similar objects into a chamber formed by a transparent cover on the toy vehicle during movement. The chamber transparent cover is highly visible to a child as the child rides or pulls the toy. The ejecting mechanism includes a head which is capable of simultaneously popping several of the balls or similar objects from a trough formed beneath the housing and is actuable through mechanical connection to the wheels of the vehicle so that rotation of the wheels during movement of the toy will actuate the mechanism to pop the various balls or similar objects. In another embodiment of the invention, the vehicle is provided with a popper mechanism which includes a dome or housing in the shape of an engine block and a second popper mechanism with a housing in the shape of an exhaust pipe extending from the engine block. Thus, the rapid movement of a number of plastic objects simultaneously in the housing representative of the engine block will provide the very visual representation of rapidly moving components and the movement of the objects in the exhaust pipe will provide the very visual representation of moving gases out of the exhaust pipe.

12 Claims, 8 Drawing Figures

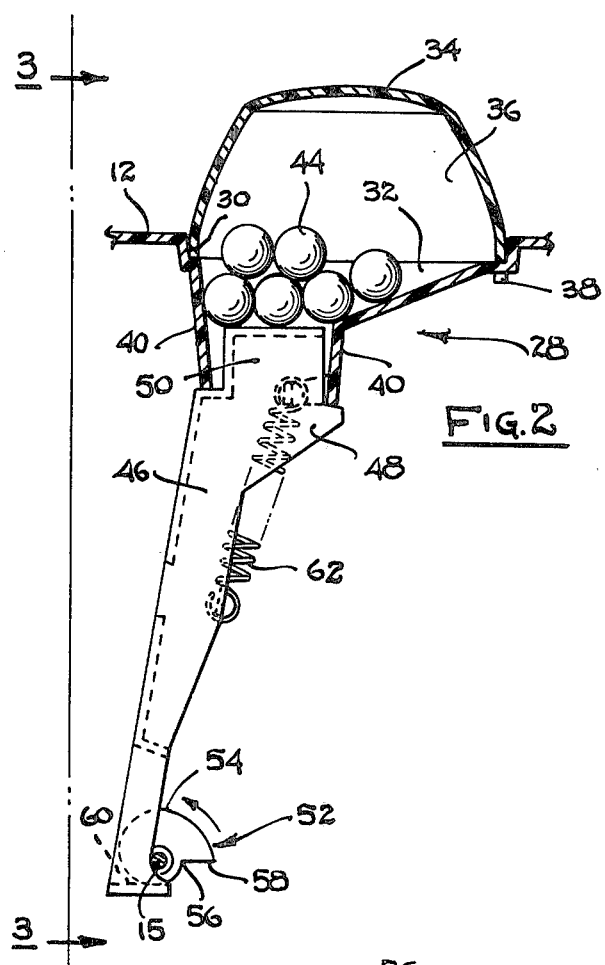
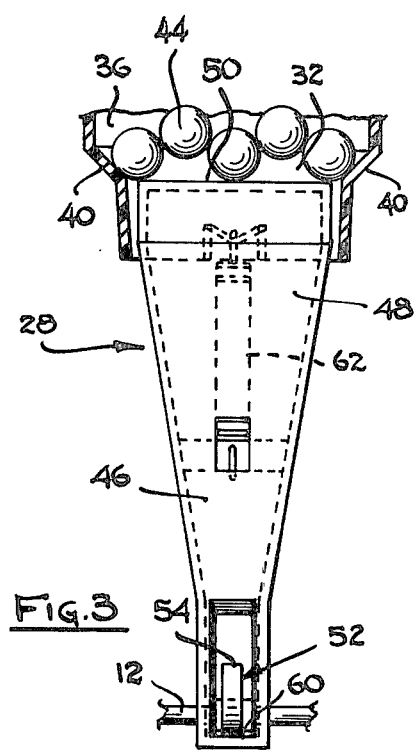
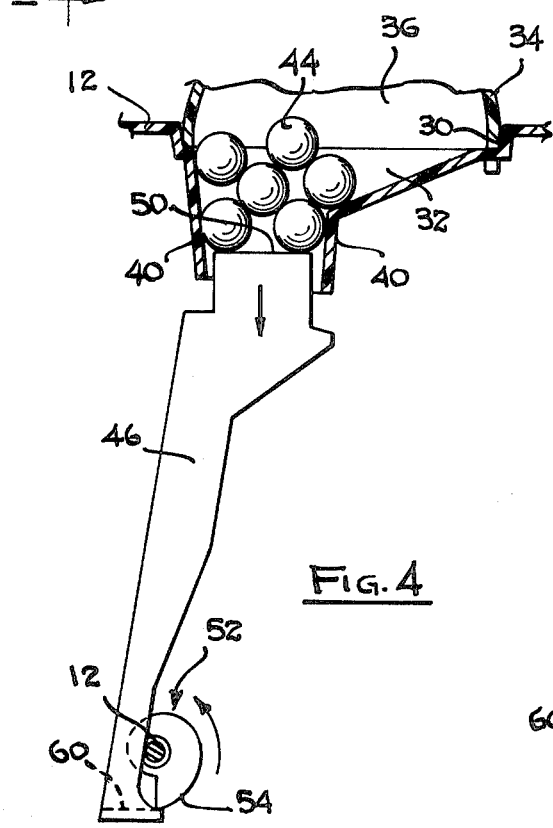
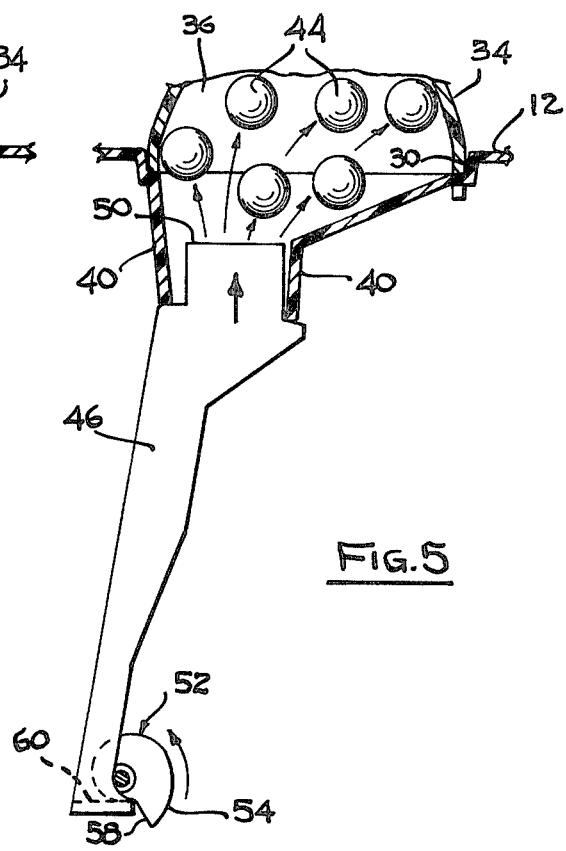

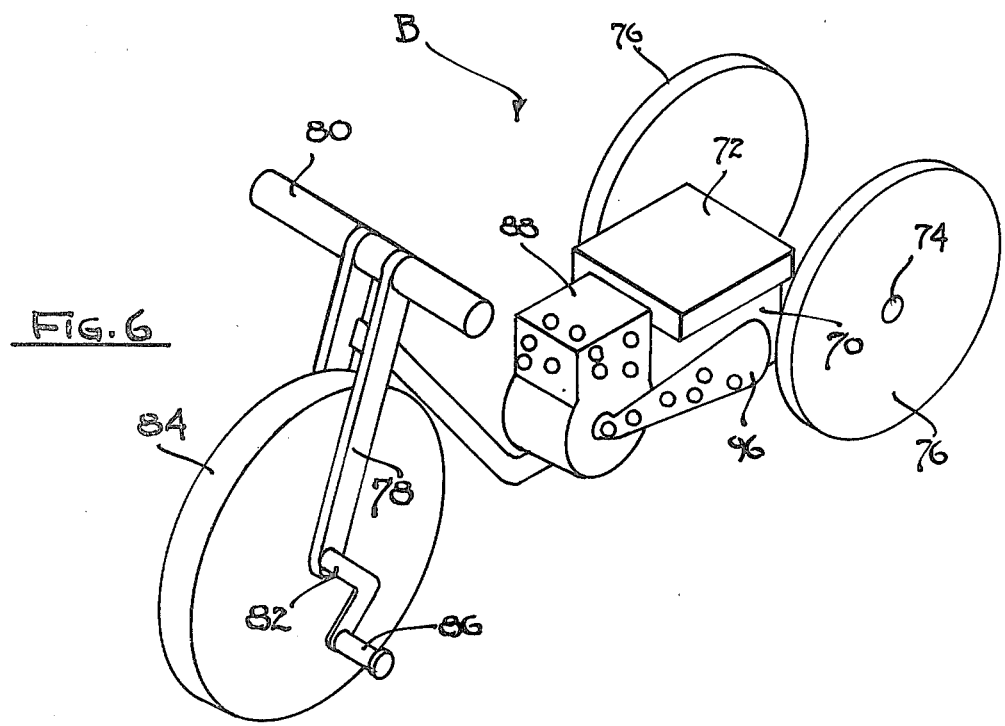
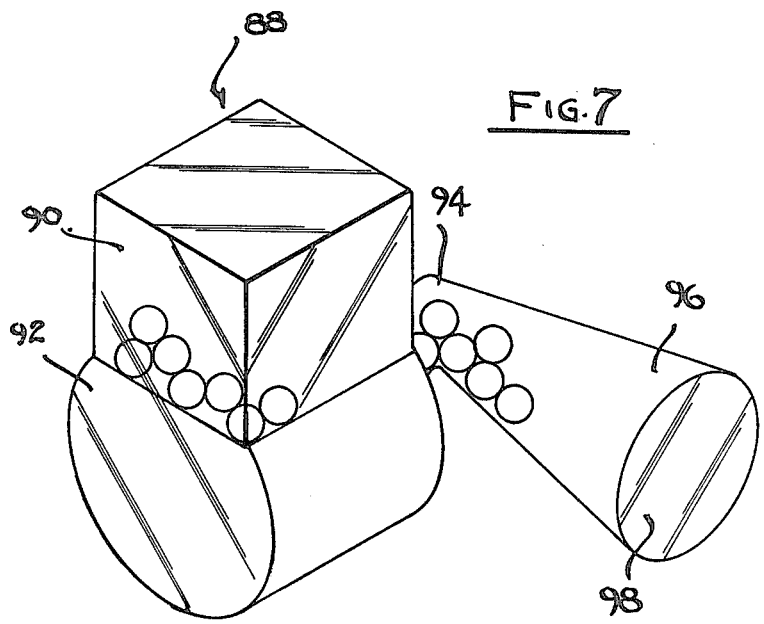

MOVABLE AMUSEMENT TOY

BACKGROUND OF THE INVENTION

1. Field of the Invention

This invention relates in general to certain new and useful improvements in preschool ride-on and/or pull or push toy vehicles, having a popper mechanism where a large number of balls or similar objects may be simultaneously propelled through a chamber formed by a highly visible transparent housing on the vehicle during movement of the vehicle.

2. Brief Description of the Prior Art

There is a prior art preschool pull toy, commercially designated as "Corn Popper", including a base having an upstanding transparent cover disposed above substantially the entire top surface of a base member. A plurality of round objects, such as plastic balls, are located within the chamber formed by the transparent cover and a recess is formed in the top wall of the base member to receive one or a few of the plastic balls. In addition, an axle having a crank portion thereon operates a push rod having a ball engaging head located within the recess and which engages one or more of the balls. As the toy is pulled by means of an outwardly struck handle, the rotating action of the crank on the axle will cause the push rod to be pulled downwardly against the action of a compression spring. Thereafter, the push rod is released for upward movement through the recess by the compression spring and engages one or a few of the balls to propel the same through the plastic housing. This type of action toy is more fully described in U.S. Pat. No. 2,937,475, dated May 24, 1960, to Crawford.

There is another prior art preschool action toy in the form of a free-wheeling carriage having a seat thereon. This type of toy is adapted for a child to sit on and push the toy through movement of legs and feet. In addition, this preschool toy has a plate mounted on an upper portion thereof with a transparent semi-hemispherical plastic dome extending over the plate and a plurality of plastic balls located within the chamber formed by the plastic dome. Moreover, it is believed that this latter toy includes a popper mechanism which pops one or more of the balls into the chamber formed by the plastic dome as the child pushes the vehicle.

The primary disadvantage of each of these toys is that the ball ejecter mechanism, or so-called "popper" mechanism, is adapted to only eject one or a few of the plastic balls through the chamber formed by the transparent dome with each actuation of the actuator or ejector mechanism. Thus, the visual effect is significantly less than if all of the balls or a substantial number of the balls were simultaneously popped into the chamber, thereby rendering a much more dynamic visual effect.

OBJECTS OF THE INVENTION

It is, therefore, a primary object of the present invention to provide a preschool amusement boy vehicle having an object propelling mechanism for simultaneously propelling a large number of objects within a highly visible transparent housing during and in response to movement of the toy vehicle.

It is another object of the present invention to provide an amusement toy vehicle of the type stated in which a popper mechanism is mechanically connected to the wheels of the vehicle so that rotation of the wheels operatively causes actuation of the popper mechanism.

It is a further object of the present invention to provide an amusement toy of the type stated which is constructed in the form of a toy vehicle for riding or pulling, and in which the transparent housing is representative of a component forming part of a vehicle engine system.

It is an additional object of the present invention to provide an amusement toy of the type stated which is highly durable in its construction and can be manufactured at a relatively low cost.

With the above and other objects in view, our invention resides in the novel features of form, construction, arrangement and combination of parts presently described and pointed out in the claims.

BRIEF SUMMARY OF THE DISCLOSURE

A preschool action play toy in the form of a vehicle which may be either pulled or pushed or sat upon and propelled by the preschool child user thereof. The toy includes an outer body with a shape and design of a toy vehicle, and in an embodiment as illustrated of the present invention, the shape and design of a toy van. The van may be provided with a pull string or rod for purposes of pulling or pushing the same. The van is also provided with a seat on the upper surface thereof for the child user to sit on and push the vehicle along the floor or similar supporting surface with his legs. In addition, the van may be provided with pedals connected to one or more of the wheels for moving the toy vehicle through a pedalling action.

A trough is formed on the top wall of the vehicle body near the forward end thereof and in front of the seat. An orthogonally shaped, and preferably generally rectangularly shaped, transparent plastic dome is located over the trough and forms a ball-receiving chamber therein. A ball ejecting mechanism or so-called "popper" mechanism is located beneath the trough within the vehicle body. The trough has an elongate construction and is generally orthogonal in shape and, preferably, rectangular in shape. The popper mechanism includes a vertically shiftable actuator with an enlarged ejector head or so-called "popper" head on the upper end of the vertically shiftable member. This enlarged ejector head is also elongate in shape and is also preferably rectangular to conform to the shape of the trough.

A plurality of plastic objects, such as plastic balls, are located within the trough and are capable of being propelled into the chamber by means of the vertically shiftable actuator. The balls are properly sized with respect to the size of the head so that a substantial number of the balls can be simultaneously propelled into the ball-receiving chamber. A large number of the balls are simultaneously ejected into the chamber during each ejecting movement of the head and which creates a very dynamic visual appearance of a fast-moving action. Moreover, the dome may be shaped to represent an engine block. In this way, the child user observes a number of moving components being rapidly propelled within the chamber as the toy vehicle is moved.

At its lower end, the vehicle is provided with a pair of spaced apart, transversely extending axles, and at least one wheel is mounted on each of these axles. In the case of the van, a pair of wheels are mounted on each of the opposite transverse ends of the axles. A cam having an enlarged shoulder thereon is mounted for rotation on one of the axles. In addition, a finger, or so-called "cam follower", is located on the lower end of the vertically shiftable actuator. Thus, as the vehicle is pushed or pulled and the axle is rotated, the cam will rotate to a position where the shoulder engages the finger on the actuator. As this occurs, continued rotation of the axle will cause the actuator to shift downwardly. When the shoulder passes the finger on the actuator, a spring will pull the actuator upwardly very quickly and cause the enlarged head to engage the balls in the trough and ejector or propel these balls into the chamber, thereby creating the highly visible dynamic action.

Another embodiment of the present invention illustrates the vehicle in the form of a toy motorcycle. In this case, the vehicle also includes a body having a plurality of wheels mounted thereon and a seat for the child user to sit upon and propel the same through a pedalling action. In addition, a transparent housing having the shape and representation of an engine block is mounted on the vehicle body. Moreover, a transparent housing having the shape and representation of an exhaust pipe is connected to the engine block on the vehicle. A pair of popper mechanisms are located with respect to each of these housings to operate upon movement of the vehicle. A first of these popper mechanisms ejects a plurality of balls into the housing representative of the engine block during movement of the vehicle, and this creates a highly visual action of a large number of components moving very rapidly in the engine block. In addition, and simultaneously therewith, a second popper mechanism located with respect to the exhaust pipe also ejects a number of the plastic objects into the exhaust pipe housing which creates the representation of rapidly moving gases in the exhaust pipe.

This invention posses many other advantages, and has purposes which may be made more clearly apparent from the consideration of forms in which it may be embodied. These forms are shown in the drawings accompanying and forming part of this present specification. They will now be described in detail for the purpose of illustrating the general principles of the invention; but it is to be understood that such detailed descriptions are not to be taken in a limiting sense.

BRIEF DESCRIPTION OF THE DRAWINGS

Figure 1:
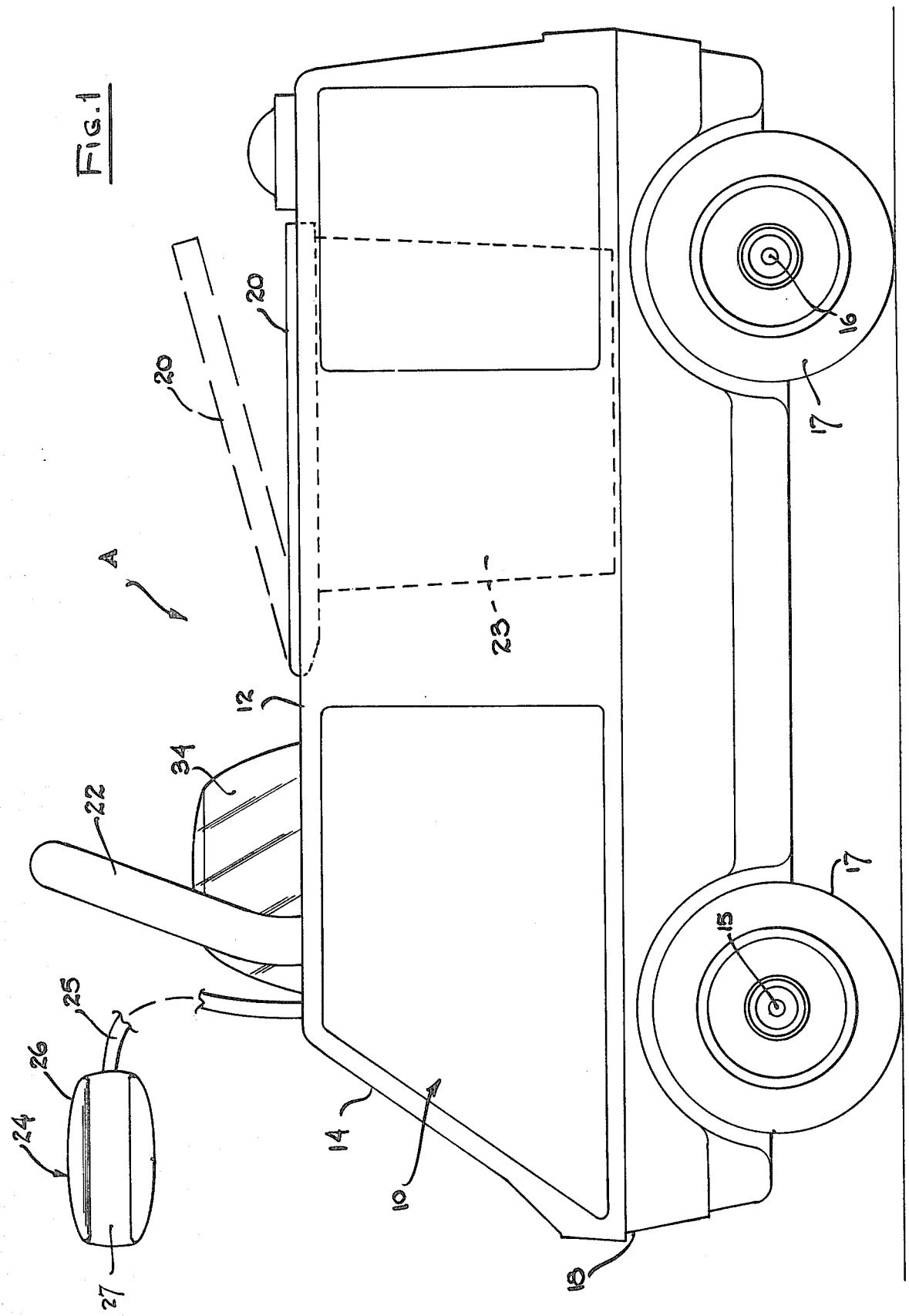
Figure 8:
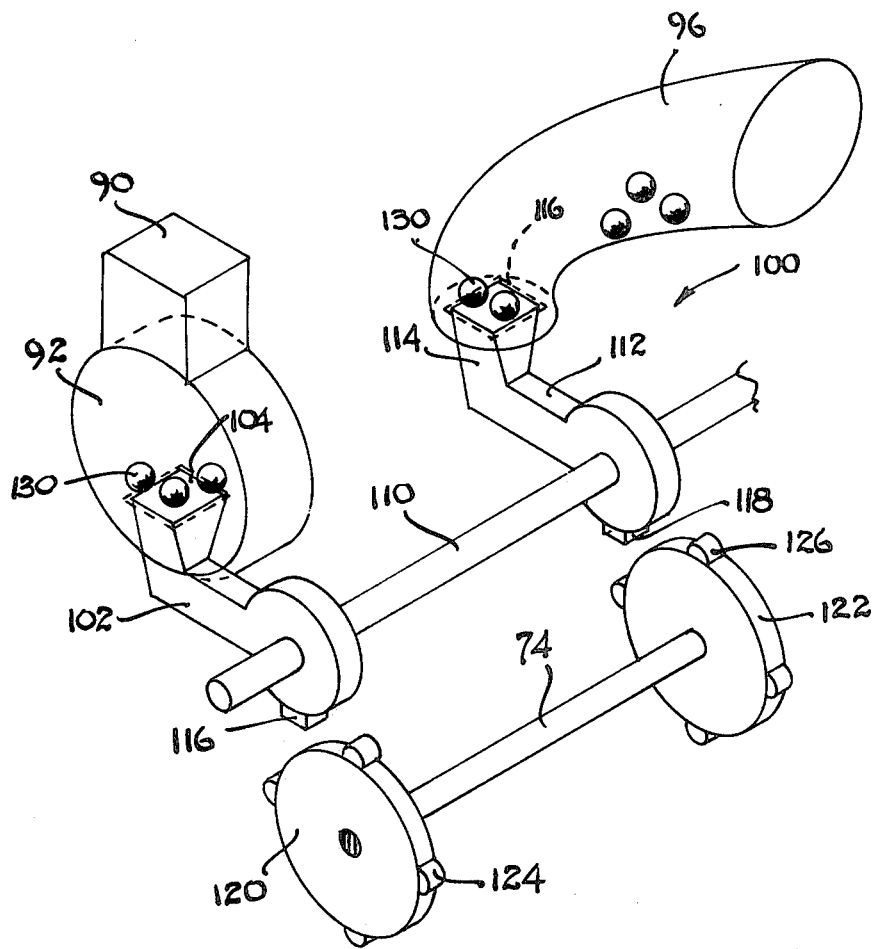

Having thus described the invention in general terms, reference will now be made to the accompanying drawings in which:

FIG. 1 is a side elevational view of a toy vehicle constructed in accordance with and embodying the present invention;

FIG. 2 is a vertical sectional view showing a part of a popper mechanism forming part of the toy vehicle of FIG. 1;

FIG. 3 is an end elevational view of the popper mechanism forming part of the toy vehicle of the present invention;

FIG. 4 is a fragmentary vertical sectional view showing the popper mechanism with an actuator in the actuated position;

FIG. 5 is a fragmentary vertical sectional view, similar to FIG. 4, and showing the actuator in the ejecting position with a plurality of plastic balls being ejected into a chamber on the upper surface of the vehicle;

FIG. 6 is a perspective view of a modified form of toy vehicle constructed in accordance with and embodying the present invention;

FIG. 7 is a perspective view showing a simulated engine and exhaust system therefor as used in the vehicle of FIG. 6; and FIG. 8 is a schematic perspective view of a pair of popper mechanism used in the engine and exhaust system of FIG. 7.

DETAILED DESCRIPTION OF THE PREFERRED EMBODIMENTS

Referring now in more detail and by reference characters to the drawings which illustrate a preferred embodiment of the present invention, A designates a toy vehicle, illustrated in the form of a van, although the vehicle could adopt the shape and configuration of any form of movable vehicle, including a boat or the like. The vehicle A is provided with an outer body 10 having a top wall 12 and an enclosing side wall 14. The vehicle is also provided with front and rear axles 15 and 16, respectively, mounted on the base of the body 10 for rotation. Mounted on each of the opposite ends of the axles 15 and 16 are conventional wheels 17.

Extending from the forward end of the body 10 is a pull string 18, which may adopt the form of a pulling rod or like structure, for the child user to pull the toy vehicle on the floor or similar supporting surface. In addition, a seat 20 is located on the top wall of the body 10 so that the child user may sit on the seat and push the vehicle along the floor or similar supporting surface with his legs. A handle 22 is mounted in proximity to the forward end on the top of the body 10 for the child user to grasp while sitting on the vehicle and pushing the same with his or her feet.

The seat 20 is hingedly connected to the top wall 12 by means of a conventional hinge (not shown) so that the seat may be raised to the position as shown in the phantom lines of FIG. 1. Moreover, the vehicle is provided with an internal compartment 23 for use in the storing of any objects therein.

For added play value, the vehicle may be provided with a toy microphone 24 connected to the vehicle body 10 through a rubber or similar flexible cord 25. The microphone includes an outer body 26 having an annular recess 27 formed therein, and which is sized and shaped so that the microphone 24 may be removably snap-fitted on the handle 22.

Many of the various components forming part of the toy vehicle of the present invention, including the ball ejecting device hereinafter described, can be formed of a number of known plastic materials, as for example, polyethylene, polystyrene, polybutadiene, various vinylidene copolymers and the like. These components may be formed in a number of known plastic molding operations, as for example, thermo-forming, injection molding or the like. In addition, for purposes of increased strength and durability, many of the components could be formed of reinforced plastic materials including, for example, fiberglas, boron, carbon and other fibers and grown crystal whiskers incorporated in a suitable matrix, such as an epoxy resin or other thermo-plastic or thermo-setting resin. Notwithstanding, many of the components of the apparatus could be formed of other known structural materials, such as metals, etc.

A ball propelling or ejecting device, or so-called "popper" device, 28 is provided in the vehicle A and comprises a somewhat rectangularly shaped opening 30 formed in the top wall of the vehicle body 10, and which leads into a ball receiving trough 32 formed within the body 10 of the vehicle. A transparent dome 34 is disposed over the opening 30 and forms a ball-receiving chamber 36 above the upper surface of the vehicle. The dome 34 is secured to the body 10 by means of integrally formed hooks 38 extending downwardly from the dome and which retentively engage the portion of the body top wall surrounding the opening 30. The dome 34 is preferably formed of a transparent plastic material, such as polymethylmethacrylate. Moreover, the dome 34 is preferably somewhat rectangular in shape to provide somewhat of a characterization and representation of an engine block.

As used herein, the popper mechanism is typically referred to as an ejecting mechanism inasmuch as it ejects the balls from a trough into a chamber. Thus, the term "ejecting" is not deemed to be taken in a sense where the balls are ejected completely outwardly of the chamber formed by the dome 34.

The rectangularly shaped opening 30 is formed by a plurality of inclined walls 40 in the manner as illustrated in FIG. 2, and these walls 40 lead into the ball receiving trough 32 which is generally elongate in the transverse dimension and is generally rectangular in shape. Thus, it can be observed that each of the inclined walls 40 are somewhat trapezoidal in shape inasmuch as they are tapered to lead directly into the trough.

A plurality of small objects, as for example, plastic balls 44, are located within the trough and are capable of being ejected or propelled into the chamber 36, in a manner to be hereinafter described in more detail. Moreover, it can be observed that the balls are relatively small with respect to the overall size of the trough so that a large number of the balls 44 may be disposed within the trough 32 at any point in time.

The ejecting device comprises a vertically shiftable actuator 46 which includes an integrally formed enlarged section 48 near the upper end thereof. Moreover, the upper enlarged section 48 integrally merges into an ejector head or popper head 50 which is sized to extend within the trough 32. The popper head 40 is similarly elongate in the transverse dimension and is also generally rectangular in shape, generally conforming to the overall size and shape of the trough 32. In this respect, it can be observed that the head 50 will snugly, but nevertheless shiftably, move within the trough 32 so that none of the plastic objects 44 can pass between the walls of the enlarged head 50 and the trough 32.

By reference to FIG. 2, it can be observed that a cam 52 is mounted on one of the axles, preferably the front axle 12. The cam 52 includes an outer cam surface 54 along with a somewhat V-shaped notch 56 formed therein which presents an abutment or so-called "drop-off" shoulder 58. Moreover, the lower end of the actuator 46 is provided with an outwardly projecting finger or so-called "cam follower" 60 which is located to be engaged by the shoulder 58. Thus, as the toy vehicle is moved, the axle 12 will rotate in the clockwise direction, reference being made to FIG. 2, and the cam 52 which is mounted thereon will also rotate in the clockwise direction. As this occurs, the shoulder 58 will come into contact with and engage the finger 60 on the actuator 46.

Continued rotation of the axle 12 and the cam 52 will cause the shoulder 58 to push the actuator 46 downwardly against the action of a compression spring 62 which is connected to the actuator 46 and to the housing 10. As the cam 52 rotates so that the shoulder 58 moves out of the position of engagement with the finger 60, the actuator 46 will be biased upwardly through the action of the spring 62. As this occurs, the actuating head 50 will engage the balls 44 and very rapidly propel these balls 44 into the chamber 36 which will create a highly visible appearance of fast-moving action.

The toy vehicle in the illustrated embodiment is represented in the form of a van, although this toy vehicle could adopt any of a variety of forms, as for example, a motorcycle, an airplane or the like. In each case, it is desirable for the vehicle to have wheels or at least some mechanism which rotates in response to movement of the vehicle so as to create the desired popping action.

FIGS. 6 through 8 illustrate a modified form of toy vehicle B constructed in accordance with and embodying the present invention. The toy vehicle B is illustrated in the form of a motorcycle and comprises an outer body 70 having a seat portion 72 mounted on the upper surface thereof. In addition, the body 70 is provided with a rear axle 74 having a pair of transversely spaced apart wheels 76 mounted for rotation thereon. Connected to the body 70 is a front steering mechanism, or so-called "fork", 78 having a conventional handlebar 80. Similarly mounted on the lower end of the fork 78 is a front axle 82 which carries a front wheel 84. Moreover, a pair of pedals 86 are connected to the axle 82 in a conventional manner for pedalling action by a child user.

Mounted on the vehicle body 70 near the forward end thereof is an outer, highly transparent housing 88 which generally adopts the form and shape of an engine block, as more fully illustrated in FIG. 7 of the drawings. In this case, the outer transparent housing 88 includes an upper housing section 90 representative of an engine block and a lower, somewhat cylindrically shaped housing section 92 representative of a crankcase forming part of the engine. In addition, the engine includes an upwardly and rearwardly extending tube 94 representative of an exhaust pipe and which is also highly transparent in its construction. In this case, the exhaust pipe 96 is provided with an enclosed rearward and outer end 98. The housing 88 including the engine block 90 and the crankcase 92, along with the exhaust pipe 96, constitute an engine system for purposes of the present invention.

FIG. 8 is a schematic perspective view of a popper actuating mechanism 100 used in connection with the engine system of FIG. 7. In this case, the popper actuating mechanism comprises an actuating arm 102 having an upwardly extending ejector head 104 which extends through an aperture 106 formed in the lower end of the crankcase section 92 forming part of the engine 88. The actuating arm 102 is mounted on a common shaft 110 along with another actuating arm 112. The actuating arm 112 is also provided with an ejector head 114 which extends upwardly through an opening 116 formed in the exhaust pipe 96.

Each of the actuating arms are provided at their rearward ends, reference being made to FIG. 8, with downwardly extending camming projections 116 and 118, respectively. Moreover, these camming projections 116 and 118 are engageable by cams 120 and 122, respectively, each of which are provided with a plurality of circumferentially spaced abutment cam projections 124 and 126. Moreover, the cams 120 and 122 are mounted commonly on the rear axle 74 for rotation therewith.

As the vehicle B is moved, as by a pedalling action, for example, the rear axle 74 will rotate, thereby causing rotation of the cams 120 and 122, in the counter-clockwise direction, reference being made to FIG. 8. As this occurs, the projections 124 and 126 on the cams 120 and 122, respectively, will engage the respective projections 116 and 118, thereby causing the actuator arms 102 and 112 to shift upwardly. As this occurs, the ejector heads 104 and 144 will extend upwardly into the openings 106 and 116.

A plurality of plastic objects 130, similar to the previously described plastic objects, are located within the housing 88 and, moreover, a plurality of plastic objects 132, similar to the previously described plastic objects are also located in the exhaust tube 96. Thus, when the ejector heads 104 and 114 extend upwardly through the openings 106 and 116, they will engage the plastic objects, such as the round balls, and propel the same. In the case of the ejector head 104, it will engage the plastic objects 130 and propel them rapidly through the engine block 90 and the crankcase 92, thereby presenting a representation of rapidly moving motion in the engine block and crankcase. The ejector head 114 which extends through the aperture 116 will also engage the plastic objects 132 and propel them upwardly and rearwardly in the exhaust tube 96, thereby creating the action of a rapidly moving gas rearwardly in the exhaust tube 96.

It can be understood that the apertures 106 and 116 are sufficiently large and may be provided with downwardly extending projections in order to receive the ejector heads 104 and 114. Thus, a large number of balls could fall within a trough formed on the underside of the apertures 106 and 116. In this way, when the ejector heads 104 and 114 extend rapidly upwardly, they will quickly engage the balls or similar plastic objects and propel them rapidly in the engine 88 and in the exhaust tube 96.

It should also be understood in connection with the present invention that the previously described ejector mechanism as used in the vehicle A could also be employed in the vehicle B. Nevertheless, it can be observed that in the case of the vehicle B, as well as in the case of the vehicle A, the movement of the balls or similar objects in the transparent housings represent movement of components of an engine. Thus, as the child user propels the vehicle, this child user will readily appreciate the rapid movement of components or gases in the portions representative of the engine system forming part of the vehicle.

Thus there has been illustrated and described a unique and novel preschool action toy which permits a large number of objects to be propelled into a chamber on movement of the housing and which therefore fulfills all of the objects and advantages sought therefor. It should be understood that many changes, modifications, variations and other uses and applications of the toy vehicle will become apparent to those skilled in the art after consideration this specification and the accompanying drawings. Therefore, any and all such changes, modifications, variations and other uses and applications which do not depart from the nature and spirit of the invention are deemed to be covered by the invention which is limited only by the following claims.

Having thus described our invention, what we desire to claim and secure by Letters Patent is:

1. An amusement toy vehicle comprising:
   (a) a vehicle body adapted for riding or pushing or pulling, said body also having an upper surface,
   (b) at least one axle on said body,
   (c) at least one wheel on said axle,
   (d) an elongate, somewhat rectangularly shaped trough formed in or near the upper surface of said body and having an inclined wall leading from said upper surface into said trough,
   (e) a highly visible somewhat rectangularly shaped transparent cover disposed over said trough and having a portion spaced upwardly from said upper surface to form a chamber therein to receive a plurality of objects ejected from said trough into said chamber and with said objects restrained by said transparent cover, said chamber having a volume substantially greater than a relatively large number of the objects, said trough having a transverse dimension almost as great as the transverse dimension of said chamber, and
   (f) an object ejecting mechanism located within said body, said object ejecting mechanism being comprised of:
      (1) a generally vertically disposed vertically shiftable member,
      (2) an elongate, somewhat rectangularly shaped popper head on said vertically shiftable member capable of extending at least partially into said trough, said head having a relatively flat upper surface with a surface area substantially equal to or only slightly less than the surface area of said trough, the flat upper surface of said head being substantially larger than any of said objects so that said head may engage and eject a relatively large number of the objects simultaneously into said chamber, said flat upper surface being generally horizontally disposed when engaging said objects and ejecting same into said chamber,
      (3) camming means cooperatable with said axles causing said vertically shiftable member to first shift downwardly on rotation of said axle and thereafter permitting operative disengagement of said shiftable member with respect to said axle, and
      (4) spring means biasing said shiftable member generally upwardly upon said disengagement so that said head engages said relatively large number of said objects and ejects them rapidly and substantially simultaneously into said chamber to create a visual appearance of fast moving action.

2. The amusement toy vehicle of claim 1 further characterized in that said transparent cover has a shape and size at least somewhat characteristic of an engine block.

3. The amusement toy vehicle of claim 1 further characterized in that said camming means comprises a cam mounted for rotation on said axle and a finger or said vertically shiftable member engageable by said cam to cause a vertically shiftable movement thereof.

4. The amusement toy vehicle of claim 3 further characterized in that said cam is provided with a drop-off shoulder intermittently engageable with said finger.

5. The amusement toy vehicle of claim 1 further characterized in that said body is provided with a seat for a child user to sit on and push said vehicle through leg action.

6. The amusement toy vehicle of claim 5 further characterized in that said vehicle is provided with a pair of spaced apart axles with a plurality of wheels on each of said axles.

7. A preschool child amusement toy vehicle comprising:

(a) a vehicle body having front and rear axles and with at least one wheel mounted on each of said axles, (b) a first transparent housing mounted on said body and forming a first interior chamber therein and which first housing has a somewhat rectangular shape so as to represent a vehicle engine, (c) a first popper mechanism associated with said first housing and capable of ejecting a plurality of small objects into said first chamber in response to movement of said vehicle, (d) a second transparent housing mounted on said body and having a portion in spaced relationship to said first transparent housing, said second transparent housing having an elongate tubular portion representative of a vehicle exhaust pipe and also having a second chamber therein, and (e) a second popper mechansim operatively associated with said second transparent housing and ejecting a plurality of plastic objects into said second chamber in response to movement of said vehicle so that the movement of the plastic objects in said exhaust pipe is visually related to the movement of the plastic objects in said vehicle engine.

8. The amusement toy vehicle of claim 7 further characterized in that each of said housings include a trough formed therein with each ejector mechanism capable of ejecting a large number of objects simultaneously into the first housing and into the second housing in response to the movement of said vehicle.

9. The amusement toy vehicle of claim 7 further characterized in that camming means is operatively associated with one of said axles and operates with said ejecting means to cause the movement of the plastic objects in response to the movement of said vehicle.

10. The amusement toy vehicle of claim 7 further characterized in that said first housing also includes a somewhat cylindrically shaped portion representative of a crankcase on an engine block.

11. A preschool child amusement toy vehicle comprising:

(a) a vehicle body having front and rear axles and with at least one wheel mounted on each of said axles, (b) a first transparent housing mounted on said body and forming a first interior chamber therein and which first housing has a somewhat rectangular shape so as to represent a vehicle engine, (c) means forming a generally rectangularly shaped trough on said first housing for receiving a plurality of small plastic objects therein, (d) a first popper mechanism associated with said first housing, said first popper mechanism comprising a shiftable first actuator and a generally rectangularly shaped first popper head on said actuator and extending into said first trough, said actuator being operable in response to movement of said vehicle and causing movement of said ejector head in said trough to eject a plurality of the small objects into said first chamber in response to movement of said vehicle, (e) first camming means operatively associated with one of said axles and being operatively associated with said first actuator to cause the movement of the first popper head and the plastic objects in response to the movement of said vehicle, (f) a second transparent housing mounted on said body and having a portion in spaced relationship to said first transparent housing, said second transparent housing having an elongate tubular portion representative of a vehicle exhaust pipe extending rearwardly with respect to said first housing and said second housing also having a second chamber therein, (g) means forming a generally rectangularly shaped second trough on said second housing for receiving a plurality of small plastic objects therein, (h) a second popper mechanism associated with said second housing, said second popper mechanism comprising a shiftable second actuator and a generally rectangularly shaped second popper head on said second actuator and extending into said second trough, said actuator being operable in response to movement of said vehicle and causing movement of said second ejector head in said second trough to eject a plurality of the second small objects into said second chamber in response to movement of said vehicle, so that the movement of the plastic objects in said exhaust pipe is visually related to the movement of the plastic objects in said vehicle engine, and (i) second camming means operatively associated with one of said axles and being operably associated with said second actuator means to cause movement of the second popper head and the plastic objects in response to the movement of said vehicle.

12. The amusement toy vehicle of claim 11 further characterized in that said first housing also includes a somewhat cylindrically shaped portion representative of a crankcase on an engine block.

* * * * *